(12) United States Patent
Mazor et al.

(10) Patent No.: US 12,153,905 B2
(45) Date of Patent: Nov. 26, 2024

(54) SYSTEM AND METHOD FOR ADDING NO-CODE MACHINE LEARNING AND ARTIFICIAL INTELLIGENCE CAPABILITIES TO INTELLIGENCE TOOLS

(71) Applicant: JPMorgan Chase Bank, N.A., New York, NY (US)

(72) Inventors: Yuval Mazor, Ra'anana (IL); Meir Kanevskiy, Neve Daniel (IL); Karin Shmit, Herzliya (IL); Asaf Harush, Herzliya (IL); Michael Jansen, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 109 days.

(21) Appl. No.: 17/456,018

(22) Filed: Nov. 22, 2021

(65) Prior Publication Data

US 2023/0161564 A1    May 25, 2023

(51) Int. Cl.
*G06F 8/34*      (2018.01)
*G06F 3/04817*   (2022.01)

(52) U.S. Cl.
CPC ............ *G06F 8/34* (2013.01); *G06F 3/04817* (2013.01)

(58) Field of Classification Search
CPC ....... G06F 8/34; G06F 3/04817; G06Q 10/10; G06N 20/00
See application file for complete search history.

(56) References Cited

U.S. PATENT DOCUMENTS

| | | | | |
|---|---|---|---|---|
| 11,645,798 | B1 * | 5/2023 | Demyanov | G06V 40/176 345/474 |
| 2017/0168809 | A1 * | 6/2017 | Zander | G06F 8/35 |
| 2017/0351511 | A1 | 12/2017 | Bar-Or et al. | |
| 2021/0034581 | A1 | 2/2021 | Boven et al. | |
| 2021/0055915 | A1 * | 2/2021 | Guo | G06N 20/00 |
| 2021/0232920 | A1 * | 7/2021 | Parangi | G06F 16/2457 |
| 2021/0397859 | A1 * | 12/2021 | Arora | G06T 7/74 |
| 2022/0050695 | A1 * | 2/2022 | Gajendran | G06N 20/00 |
| 2022/0138606 | A1 * | 5/2022 | Pasour | G06T 11/206 706/52 |
| 2023/0042210 | A1 * | 2/2023 | Yee | G06F 9/466 |
| 2023/0352122 | A1 * | 11/2023 | Mawlod | G16C 60/00 |

OTHER PUBLICATIONS

Official Communication received in PCT Application No. PCT/US2022/37596 dated Nov. 17, 2022.

* cited by examiner

*Primary Examiner* — Chat C Do
*Assistant Examiner* — Noor Alkhateeb
(74) *Attorney, Agent, or Firm* — GREENBLUM & BERNSTEIN, P.L.C.

(57) ABSTRACT

Various methods, apparatuses/systems, and media for generating a data model are disclosed. A processor receives data from a plurality of data sources; displays, onto a graphical user interface (GUI), a plurality of selectable icons for receiving user input in selecting a set of attributes data related to generating a desired data model; receives user input of the selected set of attributes data; automatically creates an executable custom code based on the received data from the plurality of data sources and the selected set of attributes data; executes the custom code; calls, in response to executing, a backend platform for processing the received data from the plurality of data sources and the selected set of attributes data; and automatically generates, in response to calling, the desired data model based on the processed received data and the selected set of attributes data.

17 Claims, 10 Drawing Sheets

SYSTEM AND METHOD FOR ADDING NO-CODE MACHINE LEARNING AND ARTIFICIAL INTELLIGENCE CAPABILITIES TO INTELLIGENCE TOOLS

TECHNICAL FIELD

This disclosure generally relates to data processing, and, more particularly, to methods and apparatuses for implementing a domain independent data processing module configured for adding no-code machine learning and artificial intelligence capabilities to intelligence tools.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, a wide variety of business functions are commonly supported by software applications and tools, i.e., business intelligence (BI) tools. For instance, software has been directed to performance analysis, project tracking, and competitive analysis, to name but a few. In general, large enterprises, corporations, agencies, institutions, and other organizations are facing a continuing problem of handling, processing, and/or accurately describing a vast amount of data (often exceeding 450 PB) that are crucial to plan actions at store level or market/regional level in an efficient and expedited manner. The stored data is often not in a centralized location, yet needs to be analyzed by a variety of persons within the organization to inform strategy, which may prove to be extremely time consuming, confusing, inaccurate, and inefficient for planning actions at both store level and market/regional level.

For example, today, when a user, while having specialized knowledge of independent variables (i.e., features) that may be predictive of execution price (i.e., interest rates curves, macro-economic variables (inflation, trade imbalances, etc.), trade histories, etc.), the user may need to rely on specialists to discover, extract, process data and develop a model. Currently, there is no specialized tool that can allow users who are not machine learning experts to access appropriate data, utilize flexible and elastic compute resources, and build their own models in order to extract value from existing vast amount of data in an accurate and timely manner.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a domain independent data processing module configured for adding no-code machine learning and artificial intelligence capabilities to intelligence tools, thereby allowing users who are not machine learning experts to access appropriate data, utilize flexible and elastic compute resources, and build their own models to extract value from existing data in an accurate and timely manner, leading to better business performance, but the disclosure is not limited thereto.

For example, the various aspects, embodiments, features, and/or sub-components may also provide optimized processes of implementing a domain independent data processing module that is configured to: integrate disparate data sources into a single location; indicate important and/or causal aspects of the data; generate models to be used for prediction and inference, etc., but the disclosure is not limited thereto.

According to an aspect of the present disclosure, a method for generating a data model by utilizing one or more processors along with allocated memory is disclosed. The method may include: receiving data from a plurality of data sources; displaying, onto a graphical user interface (GUI), a plurality of selectable icons for receiving user input in selecting a set of attributes data related to generating a desired data model; receiving user input of the selected set of attributes data; automatically creating an executable custom code based on the received data from the plurality of data sources and the selected set of attributes data; executing the custom code; calling, in response to executing, a back-end platform for processing the received data from the plurality of data sources and the selected set of attributes data; and automatically generating, in response to calling, the desired data model based on the processed received data and the selected set of attributes data.

According to a further aspect of the present disclosure, the method may further include: receiving user configuration data, wherein the configuration data includes one or more of the following data: data for a time series problem; data for a regression problem; data for a classification problem, but the disclosure is not limited thereto.

According to yet another aspect of the instant disclosure, the method may further include outputting one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto.

According to a further aspect of the instant disclosure, the plurality of data sources may be disparate data sources and the received data may be domain independent, and the method may further include: integrating the received data from the plurality of disparate data sources onto a single platform.

According to an additional aspect of the instant disclosure, the set of attributes may include one or more of the following data: features data corresponding to what data to be utilized to generate the desired data model; label data corresponding to what a user wants to predict; and data corresponding to machine learning problem type, but the disclosure is not limited thereto.

According to yet another aspect of the instant disclosure, the method may further include: outputting the desired data model onto a display; and implementing the data model to predict and infer data for further processing, thereby enabling users to extract value from existing data in an accurate and timely manner, leading to better business performance.

According to yet another aspect of the instant disclosure, in automatically creating the executable custom code, the method may further include: applying machine learning/ artificial intelligence (ML/AI) algorithm onto the received data from the plurality of data sources and the selected set of attributes data and automatically simulating the custom code.

According to another aspect of the instant disclosure, the method may further include calling the backend platform for processing the received data from the plurality of data sources and the selected set of attributes data via corresponding application programming interface (API).

According to an aspect of the present disclosure, a system for generating a data model is disclosed. The system may include: a processor; and a memory operatively connected to the processor via a communication interface, the memory storing computer readable instructions, when executed, may cause the processor to: receive data from a plurality of data sources; display, onto a GUI, a plurality of selectable icons for receiving user input in selecting a set of attributes data related to generating a desired data model; receive user input of the selected set of attributes data; automatically create an executable custom code based on the received data from the plurality of data sources and the selected set of attributes data; execute the custom code; call, in response to executing, a backend platform for processing the received data from the plurality of data sources and the selected set of attributes data; and automatically generate, in response to calling, the desired data model based on the processed received data and the selected set of attributes data.

According to a further aspect of the present disclosure, the processor may be further configured to: receive user configuration data, wherein the configuration data includes one or more of the following data: data for a time series problem; data for a regression problem; data for a classification problem, but the disclosure is not limited thereto.

According to yet another aspect of the instant disclosure, the processor may be further configured to output one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto.

According to a further aspect of the instant disclosure, the plurality of data sources may be disparate data sources and the received data may be domain independent, and the processor may be further configured to integrate the received data from the plurality of disparate data sources onto a single platform.

According to yet another aspect of the instant disclosure, the processor may be further configured to: output the desired data model onto a display; and implement the data model to predict and infer data for further processing, thereby enabling users to extract value from existing data in an accurate and timely manner, leading to better business performance.

According to yet another aspect of the instant disclosure, in automatically creating the executable custom code, the processor may be further configured to: apply ML/AI algorithm onto the received data from the plurality of data sources and the selected set of attributes data; and automatically simulate the custom code.

According to another aspect of the instant disclosure, the processor may be further configured to call the backend platform for processing the received data from the plurality of data sources and the selected set of attributes data via corresponding API.

According to an aspect of the present disclosure, a non-transitory computer readable medium configured to store instructions for generating a data model is disclosed. The instructions, when executed, may cause a processor to perform the following: receiving data from a plurality of data sources; displaying, onto a GUI, a plurality of selectable icons for receiving user input in selecting a set of attributes data related to generating a desired data model; receiving user input of the selected set of attributes data; automatically creating an executable custom code based on the received data from the plurality of data sources and the selected set of attributes data; executing the custom code; calling, in response to executing, a backend platform for processing the received data from the plurality of data sources and the selected set of attributes data; and automatically generating, in response to calling, the desired data model based on the processed received data and the selected set of attributes data.

According to a further aspect of the present disclosure, when executed, the instructions may further cause the processor to perform the following: receiving user configuration data, wherein the configuration data includes one or more of the following data: data for a time series problem; data for a regression problem; data for a classification problem, but the disclosure is not limited thereto.

According to yet another aspect of the instant disclosure, when executed, the instructions may further cause the processor to output one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto.

According to a further aspect of the instant disclosure, the plurality of data sources may be disparate data sources and the received data may be domain independent, and when executed, the instructions may further cause the processor to perform the following: integrating the received data from the plurality of disparate data sources onto a single platform.

According to yet another aspect of the instant disclosure, when executed, the instructions may further cause the processor to perform the following: outputting the desired data model onto a display; and implementing the data model to predict and infer data for further processing, thereby enabling users to extract value from existing data in an accurate and timely manner, leading to better business performance.

According to yet another aspect of the instant disclosure, in automatically creating the executable custom code, when executed, the instructions may further cause the processor to perform the following: applying ML/AI algorithm onto the received data from the plurality of data sources and the selected set of attributes data; and automatically simulating the custom code.

According to another aspect of the instant disclosure, when executed, the instructions may further cause the processor to perform the following: calling the backend platform for processing the received data from the plurality of data sources and the selected set of attributes data via corresponding API.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates an exemplary screen shot of an exemplary use case of importing a workbook into an application implemented by the domain independent data processing module of FIG. 4 in accordance with an exemplary embodiment.

FIG. 7 illustrates another exemplary screen shot of an exemplary use case of importing a workbook into an application implemented by the domain independent data processing module of FIG. 4 in accordance with an exemplary embodiment.

DETAILED DESCRIPTION

Figure 1:
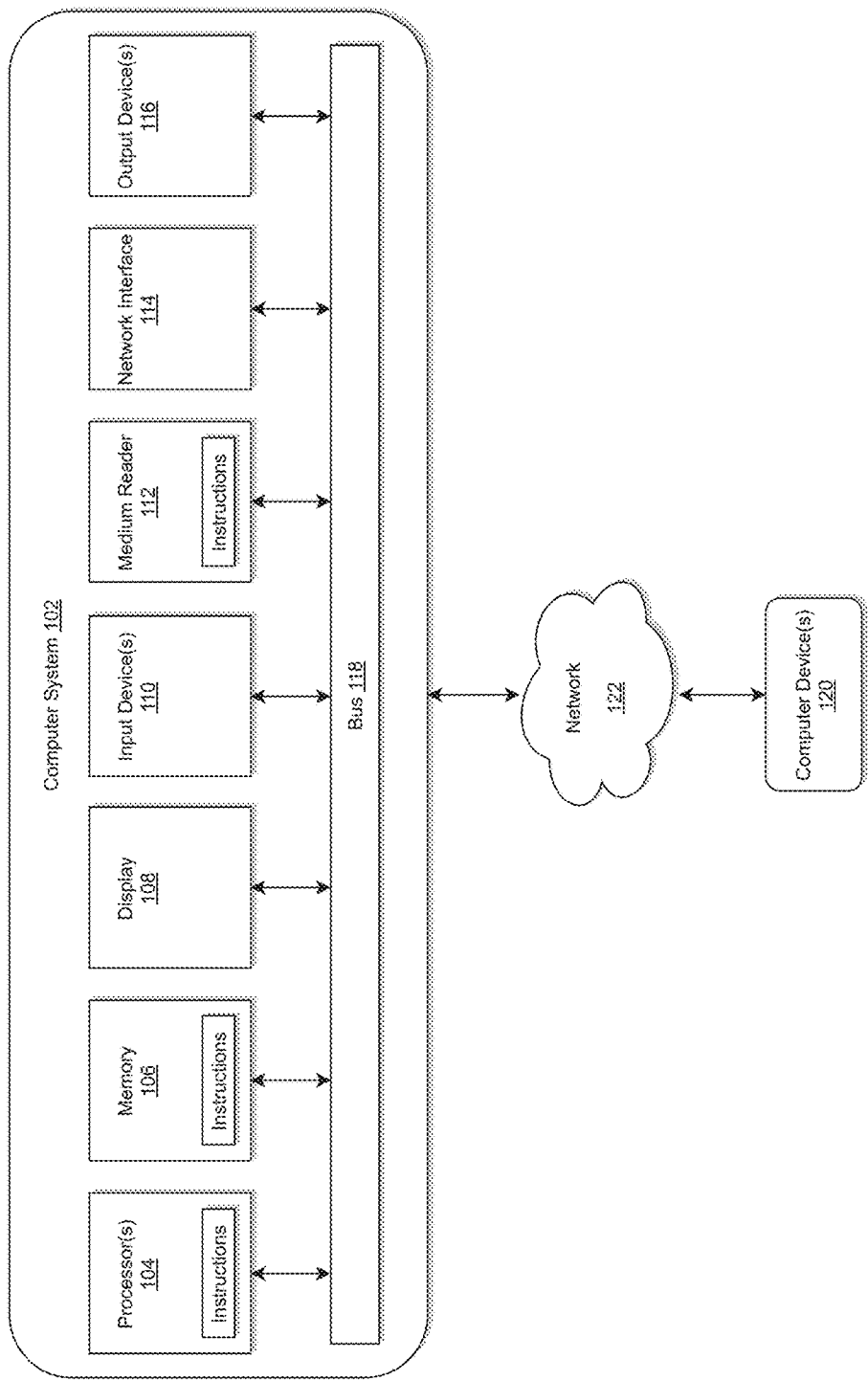
FIG. 1 illustrates a computer system for implementing a domain independent data processing module configured for adding no-code machine learning and artificial intelligence capabilities to intelligence tools in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a domain independent data processing module configured for adding no-code machine learning and artificial intelligence capabilities to intelligence tools in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
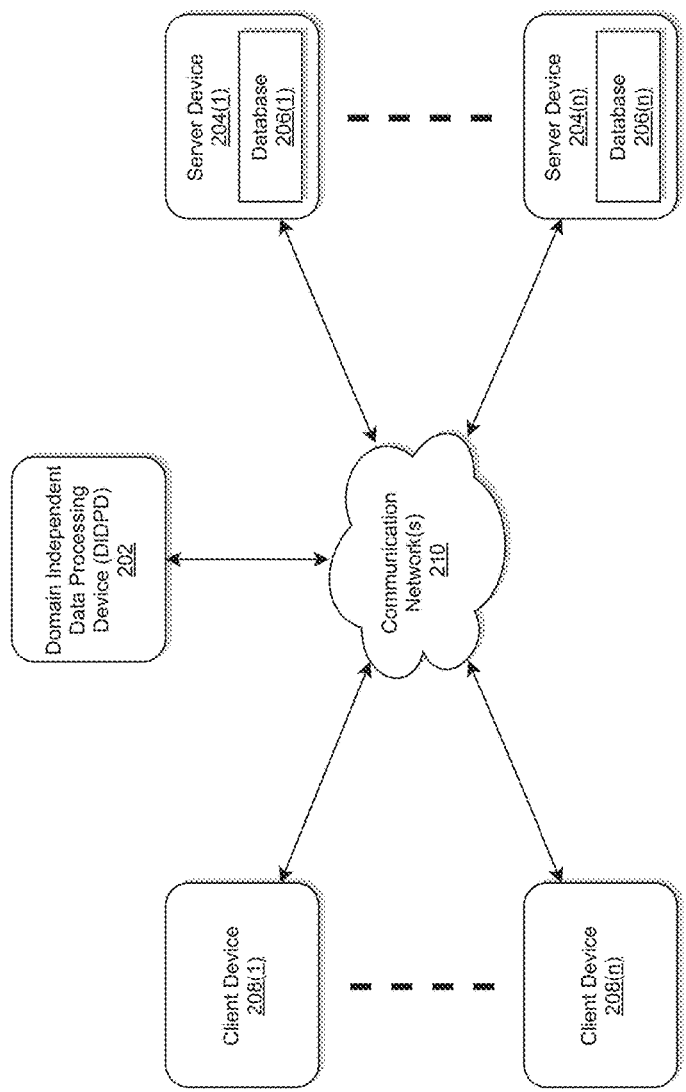
FIG. 2 illustrates an exemplary diagram of a network environment with a domain independent data processing device in accordance with an exemplary embodiment.

Referring to FIG. 2, a schematic of an exemplary network environment 200 for implementing a domain independent data processing device (DIDPD) of the instant disclosure is illustrated.

According to exemplary embodiments, the above-described problems associated with conventional approach of data processing may be overcome by implementing a DIDPD 202 as illustrated in FIG. 2 that may implement a domain independent data processing module configured for adding no-code machine learning and artificial intelligence capabilities to intelligence tools (i.e. IB tools), thereby allowing users who are not machine learning experts to access appropriate data, utilize flexible and elastic compute resources, and build their own models to extract value from existing data in an accurate and timely manner, leading to better business performance, but the disclosure is not limited thereto. For example, the DIDPD 202 may also provide optimized processes to implement a domain independent data processing module that is configured to: integrate disparate data sources into a single location; indicate important and/or causal aspects of the data; generate models to be used for prediction and inference, etc., but the disclosure is not limited thereto.

The DIDPD 202 may be the same or similar to the computer system 102 as described with respect to FIG. 1.

The DIDPD 202 may store one or more applications that can include executable instructions that, when executed by the DIDPD 202, cause the DIDPD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DIDPD 202 itself, may be located in virtual server(s) running in a cloud-based computing environment rather than being tied to one or more specific physical network computing devices. Also, the application(s) may be running in one or more virtual machines (VMs) executing on the DIDPD 202. Additionally, in one or more embodiments of this technology, virtual machine(s) running on the DIDPD 202 may be managed or supervised by a hypervisor.

In the network environment 200 of FIG. 2, the DIDPD 202 is coupled to a plurality of server devices 204(1)-204(n) that hosts a plurality of databases 206(1)-206(n), and also to a plurality of client devices 208(1)-208(n) via communication network(s) 210. A communication interface of the DIDPD 202, such as the network interface 114 of the computer system 102 of FIG. 1, operatively couples and communicates between the DIDPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DIDPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DIDPD 202 may be a standalone device or integrated with one or more other devices or apparatuses, such as one or more of the server devices 204(1)-204(n), for example. In one particular example, the DIDPD 202 may be hosted by one of the server devices 204(1)-204(n), and other arrangements are also possible. Moreover, one or more of the devices of the DIDPD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DIDPD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DIDPD 202 that may efficiently provide a platform for a domain independent data processing module configured for adding no-code machine learning and artificial intelligence capabilities to intelligence tools, thereby allowing users who are not machine learning experts to access appropriate data, utilize flexible and elastic compute resources, and build their own models to extract value from existing data in an accurate and timely manner, leading to better business performance, but the disclosure is not limited thereto. For example, the client devices 208(1)-208(n) in this example may include any type of computing device that can facilitate the implementation of the DIDPD 202 that provide optimized processes of implementing a domain independent data processing module that is configured to: integrate disparate data sources into a single location; indicate important and/or causal aspects of the data; generate models to be used for prediction and inference, etc., but the disclosure is not limited thereto.

The client devices 208(1)-208(n) may run interface applications, such as standard web browsers or standalone client applications, which may provide an interface to communicate with the DIDPD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DIDPD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DIDPD 202, the server devices 204(1)-204(n), or the client devices 208(1)-208(n), for example, may be configured to operate as virtual instances on the same physical machine. For example, one or more of the DIDPD 202, the server devices 204(1)-204(n), or the client devices 208(1)-208(n) may operate on the same physical device rather than as separate devices communicating through communication network(s) 210. Additionally, there may be more or fewer DIDPDs 202, server devices 204(1)-204(n), or client devices 208(1)-208(n) than illustrated in FIG. 2. According to exemplary embodiments, the DIDPD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
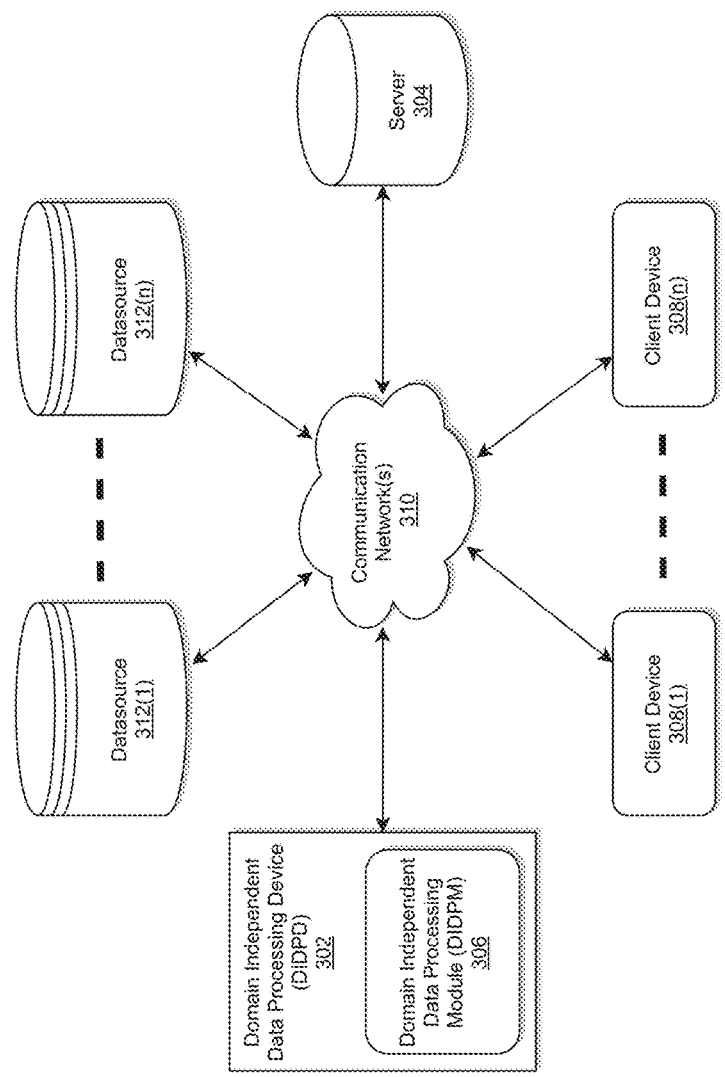
FIG. 3 illustrates a system diagram for implementing a domain independent data processing device having a domain independent data processing module in accordance with an exemplary embodiment.

FIG. 3 illustrates a system diagram for implementing a domain independent data processing device (DIDPD) having a domain independent data processing module (DIDPM) in accordance with an exemplary embodiment.

As illustrated in FIG. 3, the system 300 may include a DIDPD 302 within which a DIDPM 306 is embedded, a server 304, a plurality of data sources 312(1) . . . 312(n), a plurality of client devices 308(1) . . . 308(n), and a communication network 310.

According to exemplary embodiments, the DIDPD 302 including the DIDPM 306 may be connected to the server 304, and the data sources 312(1) . . . 312(n) via the communication network 310. The DIDPD 302 may also be connected to the plurality of client devices 308(1) . . . 308(n) via the communication network 310, but the disclosure is not limited thereto. According to exemplary embodiments, the data sources 312(1) . . . 312(n) may be disparate data sources, i.e., each data source may be different in type than the other data sources, but the disclosure is not limited thereto.

According to exemplary embodiment, the DIDPD 302 is described and shown in FIG. 3 as including the DIDPM 306, although it may include other rules, policies, modules, databases, or applications, for example. According to exemplary embodiments, the data sources 312(1) . . . 312(n) may be configured to store ready to use modules written for each API for all environments.

According to exemplary embodiments, the DIDPM 306 may be configured to receive real-time feed of data from the plurality of client devices 308(1) . . . 308(n) via the communication network 310.

As will be described below, the DIDPM 306 may be configured to receive data from a plurality of data sources;

display, onto a GUI, a plurality of selectable icons for receiving user input in selecting a set of attributes data related to generating a desired data model; receive user input of the selected set of attributes data; automatically create an executable custom code based on the received data from the plurality of data sources and the selected set of attributes data; execute the custom code; call, in response to executing, a backend platform for processing the received data from the plurality of data sources and the selected set of attributes data; and automatically generate, in response to calling, the desired data model based on the processed received data and the selected set of attributes data, but the disclosure is not limited thereto.

The plurality of client devices 308(1) ... 308(n) are illustrated as being in communication with the DIDPD 302. In this regard, the plurality of client devices 308(1) ... 308(n) may be "clients" of the DIDPD 302 and are described herein as such. Nevertheless, it is to be known and understood that the plurality of client devices 308(1) ... 308(n) need not necessarily be "clients" of the DIDPD 302, or any entity described in association therewith herein. Any additional or alternative relationship may exist between either or both of the plurality of client devices 308(1) ... 308(n) and the DIDPD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the DIDPD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DIDPD 302 may be the same or similar to the DIDPD 202 as described with respect to FIG. 2, including any features or combination of features described with respect thereto.

Figure 4:
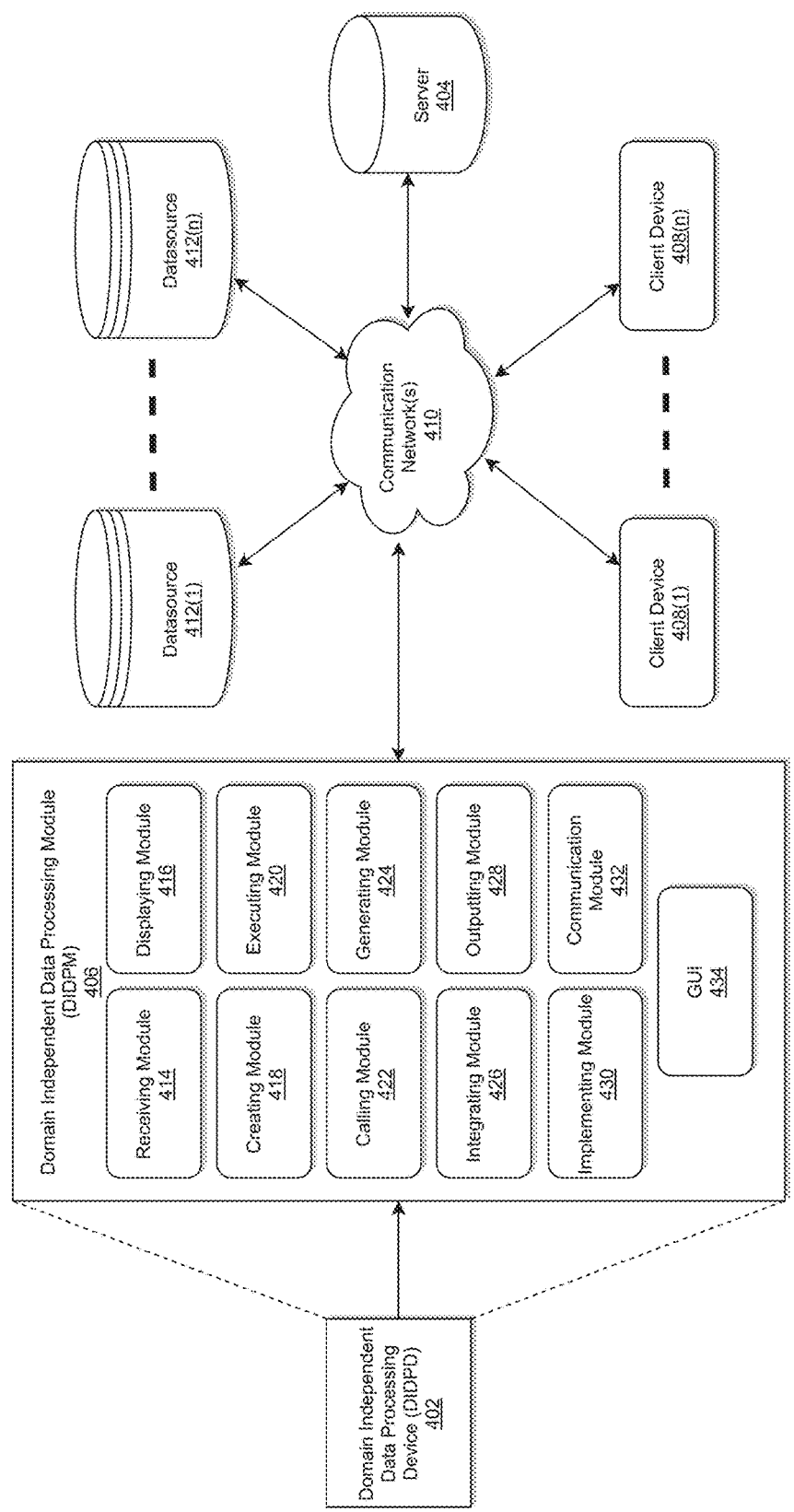
FIG. 4 illustrates a system diagram for implementing a domain independent data processing module of FIG. 3 in accordance with an exemplary embodiment.

FIG. 4 illustrates a system diagram for implementing a domain independent data processing module (DIDPM) of FIG. 3 in accordance with an exemplary embodiment.

According to exemplary embodiments, the system 400 may include a domain independent data processing device (DIDPD) 402 within which a DIDPM 406 is embedded, a server 404, data sources 412(1) ... 412(n), and a communication network 410.

According to exemplary embodiments, the DIDPD 402 including the DIDPM 406 may be connected to the server 404 and the data sources 412(1) ... 412(n) via the communication network 410. The DIDPD 402 may also be connected to the plurality of client devices 408(1)-408(n) via the communication network 410, but the disclosure is not limited thereto. The DIDPM 406, the server 404, the plurality of client devices 408(1)-408(n), the data sources 412(1) ... 412(n), the communication network 410 as illustrated in FIG. 4 may be the same or similar to the DIDPM 306, the server 304, the plurality of client devices 308(1)-308(n), the data sources 312(1) ... 312(n), the communication network 310, respectively, as illustrated in FIG. 3.

According to exemplary use case of predicting supply and demand, the data sources 412(1) ... 412(n) may include data sources for Federal Assets and Liabilities of Commercial Banks in the US (i.e., estimated weekly aggregate balance sheet for all commercial banks in the United States; separate balance sheet aggregations for several bank groups, e.g., domestically chartered commercial banks, large domestically chartered commercial banks, small domestically chartered commercial banks, foreign-related institutions in the United States); data sources for Factors Affecting Reserve Balances (i.e., balance sheet for each Federal Reserve Bank, a consolidated balance sheet for all twelve Reserve Banks, an associated statement that lists the factors affecting reserve balances of depository institutions, several other tables presenting information on the assets, liabilities, and commitments of the Federal Reserve Banks); data sources for Federal Reserve System Open Market Account (SOMA) Holdings (i.e., dollar-denominated assets acquired through open market operations); data sources for Money Manager and Real Estate Investment Trust (REIT) Holdings (i.e., demand); data sources for Japan Ministry of Finance Foreign Bond Purchases (i.e., International Transactions in Securities (Weekly; based on reports from designated major investors)); data sources for Daily Total Market Issuance Calculation-Emerging Markets Bond Index (EMBS) (i.e., supply); data sources for Desk Daily Issuance Volume via Bid Wanted In Competitions (BWICs) (i.e., supply); data sources for Historical Pricing Data (i.e., prices that demand on supply and demand over time), etc., but the disclosure is not limited thereto.

According to exemplary embodiments, as illustrated in FIG. 4, the DIDPM 406 may include a receiving module 414, a displaying module 416, a creating module 418, an executing module 420, a calling module 422, a generating module 424, an integrating module 426, an outputting module 428, an implementing module 430, a communication module 432, and a GUI 440.

According to exemplary embodiments, each of the receiving module 414, displaying module 416, creating module 418, executing module 420, calling module 422, generating module 424, integrating module 426, outputting module 428, implementing module 430, and the communication module 432 of the DIDPM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the receiving module 414, displaying module 416, creating module 418, executing module 420, calling module 422, generating module 424, integrating module 426, outputting module 428, implementing module 430, and the communication module 432 of the DIDPM 406 may be implemented by microprocessors or similar, and may be programmed using software (e.g., microcode) to perform various functions discussed herein and may optionally be driven by firmware and/or software.

Alternatively, according to exemplary embodiments, each of the receiving module 414, displaying module 416, creating module 418, executing module 420, calling module 422, generating module 424, integrating module 426, outputting module 428, implementing module 430, and the communication module 432 of the DIDPM 406 may be implemented by dedicated hardware, or as a combination of dedicated hardware to perform some functions and a processor (e.g., one or more programmed microprocessors and associated circuitry) to perform other functions.

According to exemplary embodiments, each of the receiving module 414, displaying module 416, creating module 418, executing module 420, calling module 422, generating module 424, integrating module 426, outputting module 428, implementing module 430, and the communication module 432 of the DIDPM 406 may be called via corresponding API.

The process may be executed via the communication module 432 and the communication network 410, which may comprise plural networks as described above. For example, in an exemplary embodiment, the various components of the DIDPM 406 may communicate with the server 404, and the data sources 412(1) . . . 412(n) via the communication module 432 and the communication network 410. Of course, these embodiments are merely exemplary and are not limiting or exhaustive.

According to exemplary embodiments, the communication network 410 and the communication module 432 may be configured to establish a link between the data sources 412(1) . . . 412(n), the client devices 408(1)-408(n) and the DIDPM 406, 506.

Figure 5:
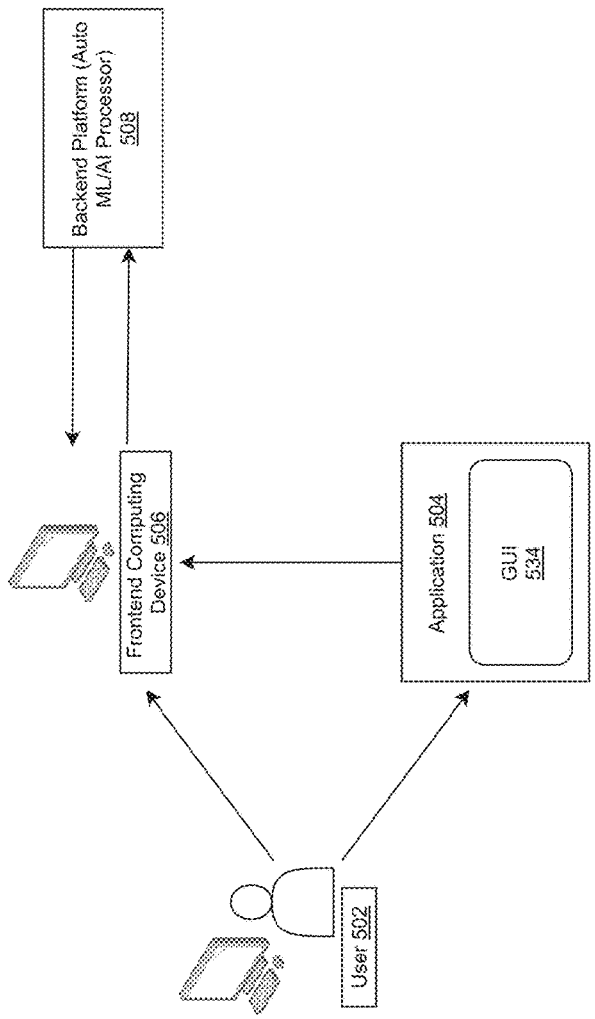
FIG. 5 illustrates an exemplary architecture implemented by the domain independent data processing module of FIG. 4 in accordance with an exemplary embodiment.

FIG. 5 illustrates an exemplary architecture 500 implemented by the DIDPM 406 of FIG. 4 in accordance with an exemplary embodiment. As illustrated in the FIG. 5, the architecture 500 may include an application 504 including a GUI 534, a frontend computing device 506, and a backend platform (i.e., an auto ML/AI processor), but the disclosure is not limited thereto).

Referring to FIGS. 4 and 5, according to exemplary embodiments, the receiving module 414 may be configured to receive data from a plurality of data sources (i.e., data sources 412(1) . . . 412(n)). A user 502 may import these data from the plurality of data sources 412(1) . . . 412(n) and upload onto the application 504 via the GUI 534.

According to exemplary embodiments, the displaying module 416 may be configured to display, onto the GUI 534 a plurality of selectable icons (see, e.g., FIGS. 6 and 7) for receiving user input in selecting a set of attributes data related to generating a desired data model.

Figure 6:
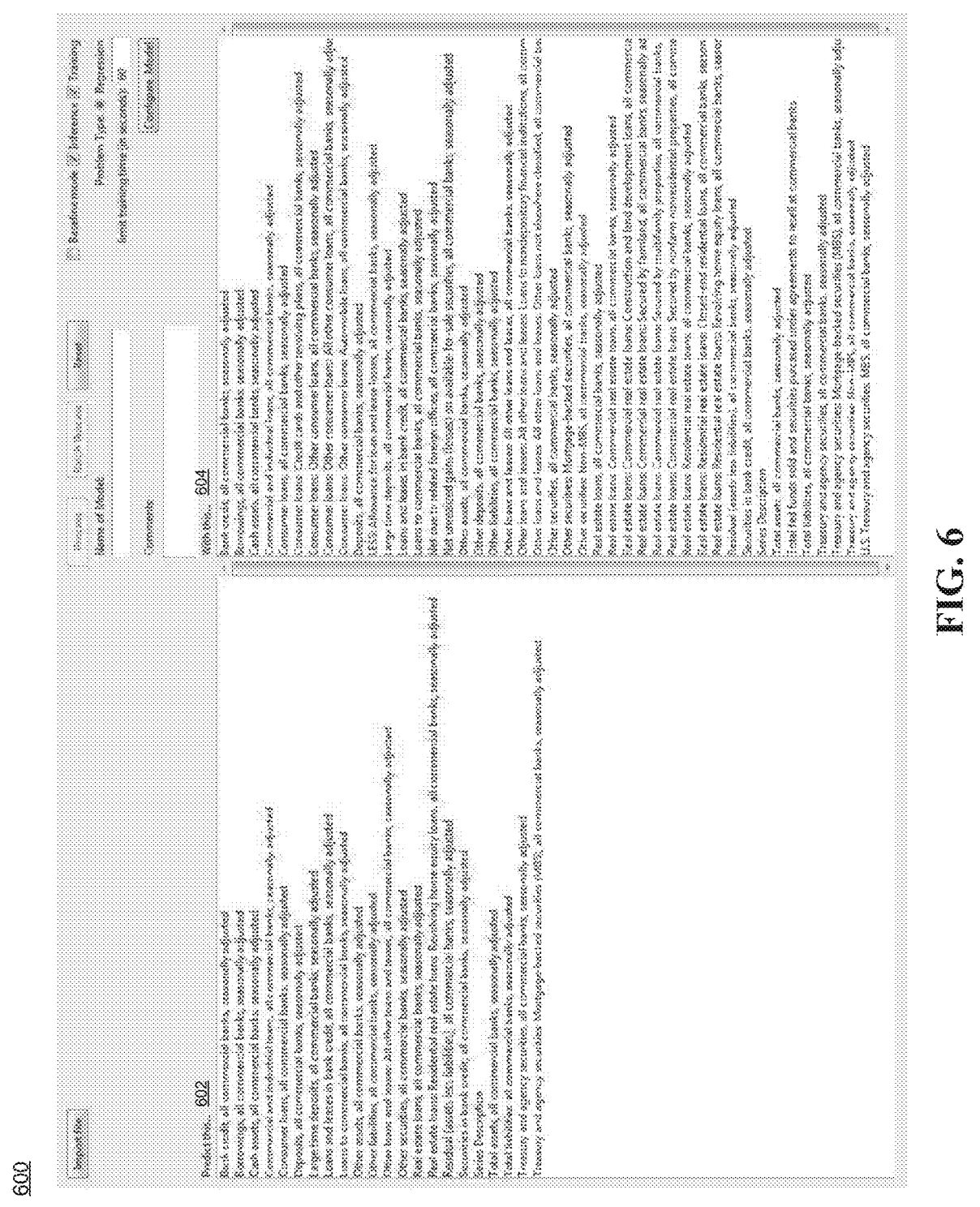
Figure 7:
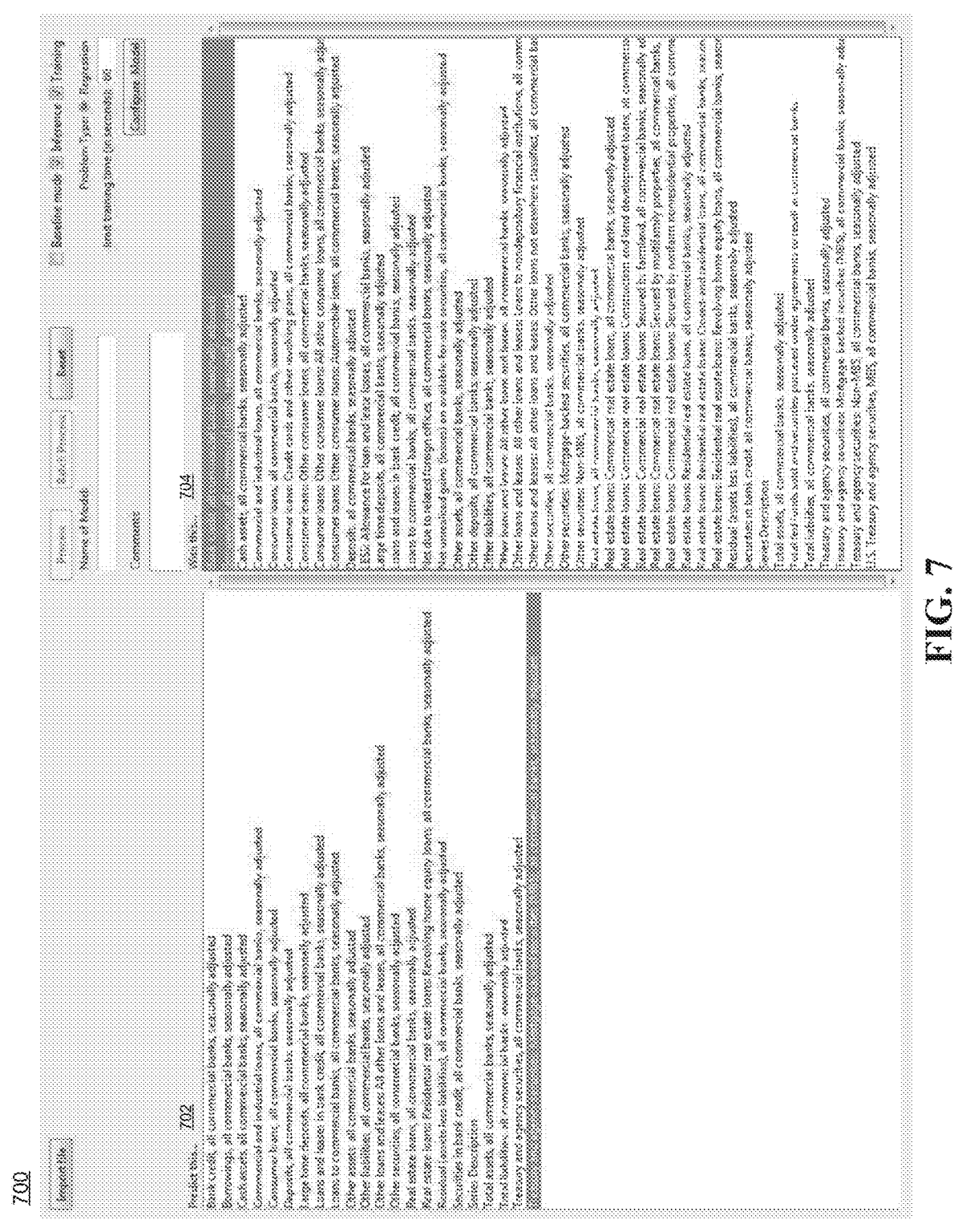

For example, FIG. 6 illustrates an exemplary screen shot 600 of an exemplary use case of importing a workbook into the application 504 implemented by the DIDPM 406 of FIG. 4 in accordance with an exemplary embodiment. FIG. 7 illustrates another exemplary screen shot 700 of the exemplary use case of importing a workbook into an application implemented by the DIDPM 406 of FIG. 4 in accordance with an exemplary embodiment.

The application 504 may be a first part of the no-code solution for democratization of ML/AI and the backend platform 508 (i.e., ML/AI processor) may be the second part of the no-code solution. According to exemplary embodiments, through the use of the backend platform 508, the application 504 finds the best models on received data imported by the user 502 onto the GUI 534.

According to the exemplary use case as illustrated in FIG. 6, the GUI 534 may initially display two files: an executable file for the application 504; and an executable file for the Tableau TabPy Server (i.e., server 404). In order to work with Tableau and the application 504, the user 502 may need to have the TabPy Server running. From an installation directory displayed on the GUI 534, the user may double-click the tabpy_launcher.exe file.

The application 504 may be utilized to load sample data from, e.g., the Federal Reserve H8 report, but the disclosure is not limited thereto. Any other sample data received from any other desired data sources may be utilized without departing from the scope of the disclosed invention. This report details assets and liabilities of commercial banks and is published every Friday afternoon at 4:30 PM. The user 502 may launch a Tableau Desktop (i.e., a desktop implemented within the frontend computing device 506) by double-clicking the enclosed FRB_8.twb file. If prompted to, the user 502 may be allowed to enter the path of the FRB_H8_Cleaned.csv file displayed on the GUI 534. As illustrated in FIG. 6, the screen shot 600 may include a data source tab. The GUI 534 may display, as an exemplary use case, field named Treasury and agency securities: Mortgage-backed securities (MBS), all commercial banks, seasonally adjusted. The DIDPM 406 and the application 504 may utilize this field as target variable or label. In essence, this may be the field the DIDPM 406 and the application 504 may try to predict using other fields from the file. This field may have many missing values, particularly in the years before 2009, however, the DIDPM 406 and the application 504 may automatically ignore these missing values without departing from the scope of the disclosed invention.

According to exemplary embodiments, the application 504 may be utilized to select target variable and predictor variables, or features. These may be the variables used to predict the target. In other words, the application 504 may find a function $f$ of the predictor variables that is as close as possible to the actual value of the label. Formally: f (predictors)≈label, where the ≈ symbol can be read as "approximately equal".

As illustrated in FIG. 6, on the top-right of the screen shot 600, the user 502 may click the button/icon/tab labeled Import File. From the File Open dialog, the user 502 can choose the FRB_8.twb workbook and click Open icon/tab. In the Predict this . . . column 602, the user can select the value Treasury and agency securities: Mortgage-backed securities (MBS), all commercial banks, seasonally adjusted. In the With this . . . column 604, the user 502 can select the following values: Bank credit, all commercial banks, seasonally adjusted; Borrowings, all commercial banks, seasonally adjusted, and thereby the screen should look similar to the screen shot 700 as illustrated in FIG. 7. As described earlier, the left column 702 contains the target variable or label while the right column 704 contains the predictors or features.

Above the right column 704, the user 502 may enter my_first_model in the Name of Model field. The Process button as illustrated in FIG. 7 may now become active. The user 502 may click the Process button and enter the name my_first_model.twb as the name for a new Tableau workbook and then click Save.

Referring back to FIGS. 4-7, according to exemplary embodiments, the receiving module 414 may be further configured to receive user input of the selected set of attributes data as illustrated in FIGS. 6 and 7. The creating module 418 may be configured to automatically create an executable workbook as disclosed above including custom code based on the received data from the plurality of data sources and the selected set of attributes data. According to exemplary embodiments, the executing module 420 may be configured to execute the custom code; and the calling module 422 may be configured to call, in response to executing, the backend platform 508 for processing the received data from the plurality of data sources and the selected set of attributes data. The generating module 424 may be configured to automatically generate, in response to calling, the desired data model based on the processed received data and the selected set of attributes data.

According to exemplary embodiments, the set of attributes may include one or more of the following data: features data corresponding to what data to be utilized to generate the desired data model; label data corresponding to what a user wants to predict; and data corresponding to machine learning problem type, but the disclosure is not limited thereto.

According exemplary embodiments, the receiving module 414 may further be configured to receive user configuration data, wherein the configuration data may include one or more of the following data: data for a time series problem; data for a regression problem; data for a classification problem, but the disclosure is not limited thereto. For example, the DIDPM 406 may be configured to generate advanced configuration, i.e., receiving user input data related to different types of algorithm-receiving user input data related to different types of transformation, i.e., using feature $x^2$ instead of feature x, but the disclosure is not limited thereto.

According to exemplary embodiments, the outputting module 418 may be configured to output one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto.

According to exemplary embodiments, the plurality of data sources 412(1) ... 412(n) may be disparate data sources and the received data may be domain independent, and the integrating module 426 may be configured to integrate the received data from the plurality of disparate data sources onto a single platform.

According to exemplary embodiments, the outputting module 428 may be further configured to output the desired data model onto a display (i.e., GUI 534); and the implementing module 430 may be configured to implement the data model to predict and infer data for further processing, thereby enabling users to extract value from existing data in an accurate and timely manner, leading to better business performance, but the disclosure is not limited thereto.

According to an exemplary use case, the executing module 420 may run the models from a Tableau. The GUI 534 may show a Tableau workbook that has the custom code created by the creating module 418. According to exemplary embodiments, the workbook may include a "Measures" column where a user can see three fields with prefix my_first_model_0.1 (signifying the name and version of the model) along with the names evaluate, fit and predict: _my_first_model_0.1_evaluate; _my_first_model_0.1_fit; and my_first_model_0.1_predict, but the disclosure is not limited thereto. These are the custom fields (or measures) that the application has put into the Tableau workbook.

Figure 8:
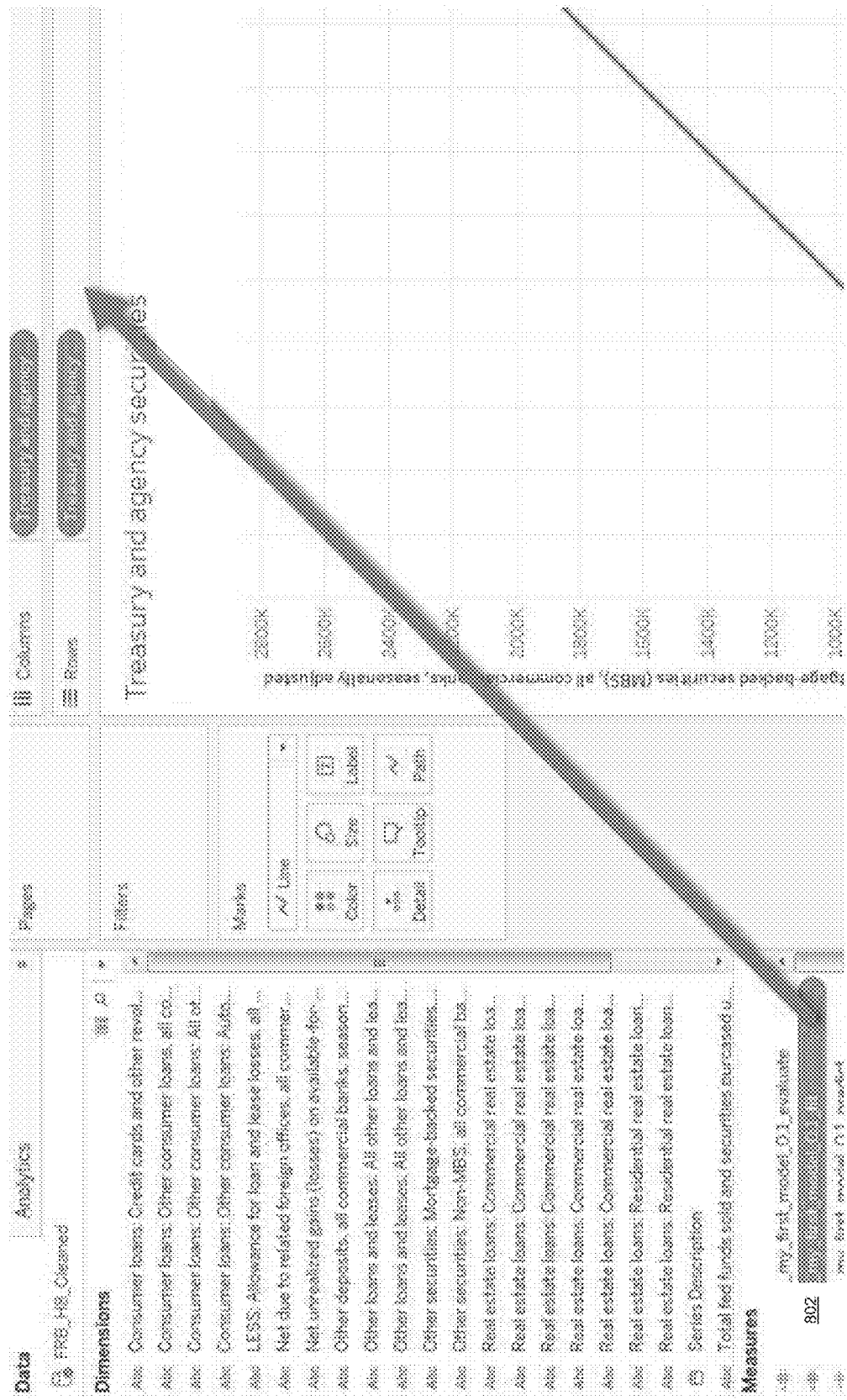
FIG. 8 illustrates an exemplary screen shot of an exemplary use case of fitting a model implemented by the domain independent data processing module of FIG. 4 into an application in accordance with an exemplary embodiment.

For example, FIG. 8 illustrates an exemplary screen shot 800 of an exemplary use case of fitting a model implemented by the DIDPM 406 of FIG. 4 into an application in accordance with an exemplary embodiment. Referring back to FIGS. 4, 5, and 8, according to exemplary embodiments, the DIDPM 406 may be configured to fit the model. This will perform the machine learning step we discussed earlier. A prediction tab may selected by the user 502. According to exemplary embodiments, a diagonal line in the screen shot may be referred to as the perfect-fit line. The X-axis (horizontal) may show the actual, ground-truth data provided by the dataset. The Y-axis (vertical) may show the predictions of the model. When a model's predictions our precisely equal to the real data they will fall exactly on this line. So intuitively, the better a model is the "tighter" it will be around the line. As illustrated in FIG. 8, from the Measures column 802, user 502 may drag the "_my_first_model_0.1_fit" field to the Rows pane on top of the chart, thereby a dialog box may appear showing that the request is being processed. This should take no longer than a minute, but the disclosure is not limited thereto. The DIDPM 406 may be configured to overlay the two images on top of each other to emphasize this point.

According to exemplary embodiments, the DIDPM 406 may be configured to evaluating the model. When splitting a dataset into training and test sets, the DIDPM 406 may utilize the training set for fitting the model, and then utilize the test set as a way of 'testing' the model and comparing its answers with the actual results already obtained previously. A good model that generalizes well may show the same behavior (i.e., 'tightness' around the perfect-fit line) as the train set.

Once a model has been trained and evaluated for generalizability, it can be used for prediction. That is, one can provide new data which has only the relevant features and the model will predict the label.

Figure 9:
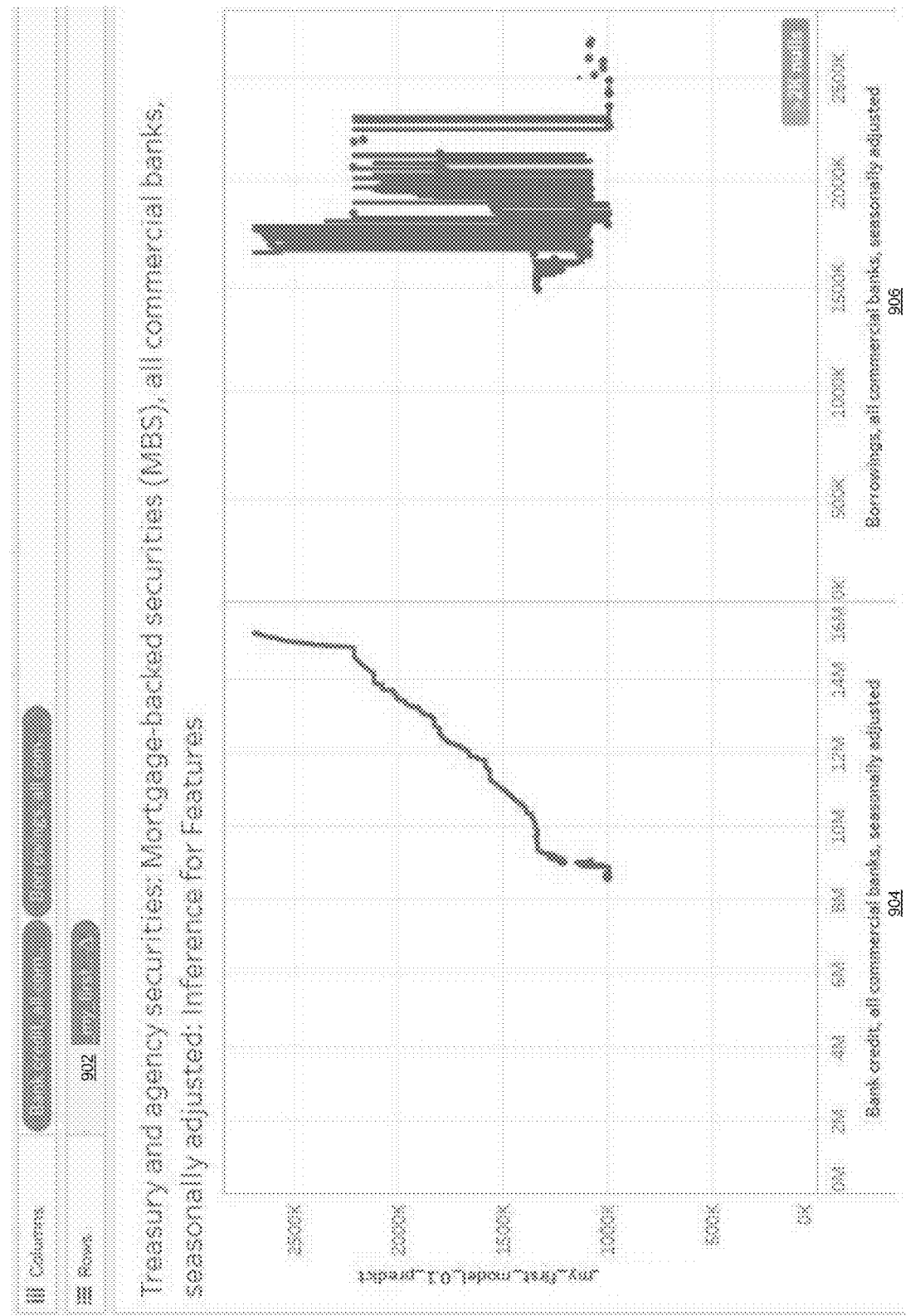
FIG. 9 illustrates an exemplary screen shot of an exemplary use case of utilizing the model of FIG. 8 for prediction in accordance with an exemplary embodiment.

FIG. 9 illustrates an exemplary screen shot 900 of an exemplary use case of utilizing the model of FIG. 8 for prediction in accordance with an exemplary embodiment. Referring back to FIGS. 4-9, according to exemplary embodiments, the model of FIG. 8 is utilized by the DIDPM 406 to predict on the same data utilized for training and evaluation. It can be used to see relationships between the predictors and the label. As illustrated in FIG. 9, on the lower left-hand side of screen shot 900, the user 502 can select tab named Inference (e.g., as illustrated in FIGS. 6 and 7). The displaying module 416 may show two horizontal charts with the following labels: Bank Credit, all commercial banks, seasonally adjusted 904; and Borrowings, all commercial banks, seasonally adjusted 906. These may be output as predictor variables or features. The DIDPM 406 than get values from the model for each one of these predictors. From the Measures column 802, the user 502 may drag the "_my_first_model_0.1_predict field (not shown) to the Rows pane on top of the screen shot 800 as illustrated in FIG. 8. As illustrated in FIG. 9, the Y-axis is added to each chart, where the X-axis was provided by data of the appropriate predictor. It can be seen that for this model, the Bank Credit predictor has a well-defined effect on the label. By moving a mouse cursor along the result curves, one can see the values provided by the model as well as the ground-truth data.

According to exemplary embodiments, the DIDPM 406 may be further configured to generate a model to predict on new data. The DIDPM 406 may utilize a dataset where there are values only for the features and get values for the labels from the model. A user can select a tab named Data Source (not shown). Upon selection, the displaying module 416 may display columns that belong to the H8 FRB report. The user can now replace the displayed data which was utilized for training with the data that will be utilized for prediction by implementing the methodologies described above with respect to FIGS. 4-9.

According to exemplary embodiments, in automatically creating the executable custom code, the implementing module 430 may be configured to apply ML/AI algorithm onto the received data from the plurality of data sources and the selected set of attributes data; and automatically simulate the custom code. Thus, according to exemplary embodiments, a user can simply drag the generated code and drop it to a specific chart to see if it fits a model.

According to exemplary embodiments, the calling module 422 may be further configured to call the backend platform 508 for processing the received data from the plurality of data sources and the selected set of attributes data via corresponding API.

Figure 10:
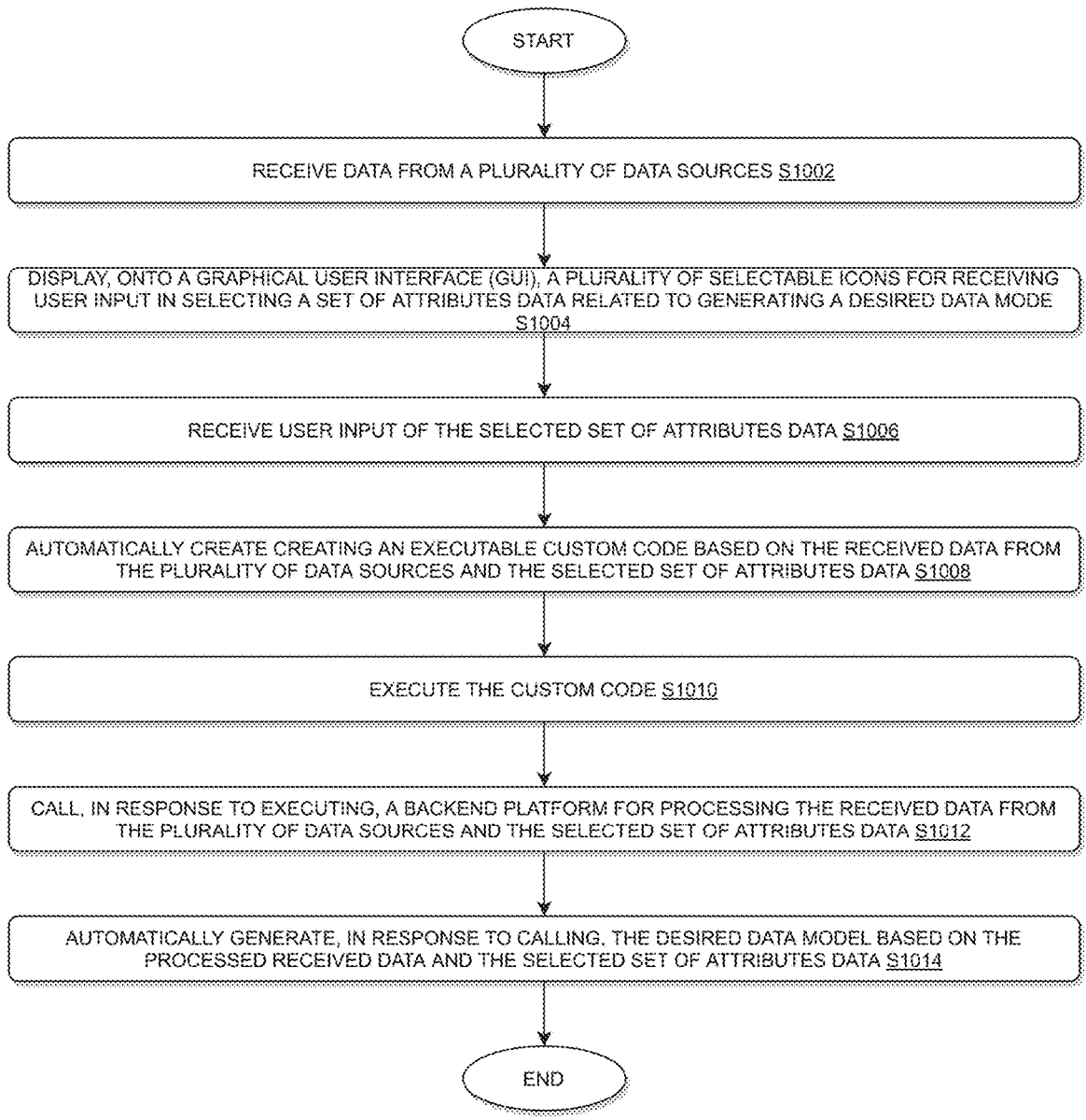
FIG. 10 illustrates a flow chart for implementing a domain independent data processing module configured for adding no-code machine learning and artificial intelligence capabilities to intelligence tools in accordance with an exemplary embodiment.

FIG. 10 illustrates a flow chart of a process 1000 for implementing a domain independent data processing module configured for adding no-code machine learning and artificial intelligence capabilities to intelligence tools in accordance with an exemplary embodiment in accordance with an exemplary embodiment. It will be appreciated that the illustrated process 1000 and associated steps may be performed in a different order, with illustrated steps omitted, with additional steps added, or with a combination of reordered, combined, omitted, or additional steps.

As illustrated in FIG. 10, at step S1002, the process 1000 may include receiving data from a plurality of data sources. At step S1004, the process 1000 may include displaying, onto a graphical user interface (GUI), a plurality of selectable icons for receiving user input in selecting a set of attributes data related to generating a desired data model. At step S1006, the process 1000 may include receiving user input of the selected set of attributes data. According to exemplary embodiments, the plurality of data sources may be disparate data sources and the received data may be domain independent, and the process 1000 may include integrating the received data from the plurality of disparate data sources onto a single platform.

At step S1008, the process 1000 may include automatically creating an executable custom code based on the received data from the plurality of data sources and the selected set of attributes data.

At step S1010, the process 1000 may include executing the custom code.

At step S1012, the process 1000 may include calling, in response to executing, a backend platform for processing the received data from the plurality of data sources and the selected set of attributes data.

At step S1014, the process 1000 may include automatically generating, in response to calling, the desired data model based on the processed received data and the selected set of attributes data.

According to exemplary embodiments, the process 1000 may further include: receiving user configuration data, wherein the configuration data may include one or more of the following data: data for a time series problem; data for a regression problem; data for a classification problem, but the disclosure is not limited thereto.

According to exemplary embodiments, the process 1000 may further include outputting one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto. According to exemplary embodiments, the set of attributes may include one or more of the following data: features data corresponding to what data to be utilized to generate the desired data model; label data corresponding to what a user wants to predict; and data corresponding to machine learning problem type, but the disclosure is not limited thereto.

According to exemplary embodiments, the process 1000 may further include outputting the desired data model onto a display; and implementing the data model to predict and infer data for further processing, thereby enabling users to extract value from existing data in an accurate and timely manner, leading to better business performance, but the disclosure is not limited thereto.

According to exemplary embodiments, in automatically creating the executable custom code, the process 1000 may further include: applying machine learning/artificial intelligence (ML/AI) algorithm onto the received data from the plurality of data sources and the selected set of attributes data and automatically simulating the custom code.

According to exemplary embodiments, the process 1000 may further include calling the backend platform for processing the received data from the plurality of data sources and the selected set of attributes data via corresponding API.

According to exemplary embodiments, the DIDPD 402 may include a memory (e.g., a memory 106 as illustrated in FIG. 1) which may be a non-transitory computer readable medium that may be configured to store instructions for implementing a DIDPM 406 for adding no-code machine learning and artificial intelligence capabilities to intelligence tools as disclosed herein. The DIDPD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DIDPM 406, 506 or within the DIDPD 402, may be used to perform one or more of the methods and processes as described herein. In a particular embodiment, the instructions may reside completely, or at least partially, within the memory 106, the medium reader 112, and/or the processor 104 (see FIG. 1) during execution by the DIDPD 402.

According to exemplary embodiments, the instructions, when executed, may cause a processor embedded within the DIDPM 406 or the DIDPD 402 to perform the following: receiving data from a plurality of data sources; displaying, onto a graphical user interface (GUI), a plurality of selectable icons for receiving user input in selecting a set of attributes data related to generating a desired data model; receiving user input of the selected set of attributes data; automatically creating an executable custom code based on the received data from the plurality of data sources and the selected set of attributes data; executing the custom code; calling, in response to executing, a backend platform for processing the received data from the plurality of data sources and the selected set of attributes data; and automatically generating, in response to calling, the desired data model based on the processed received data and the selected set of attributes data. The processor may be the same or similar to the processor 104 as illustrated in FIG. 1 or the processor embedded within DIDPD 202, DIDPD 302, DIDPD 402, and DIDPM 406.

According to exemplary embodiments, the instructions, when executed, may cause the processor 104 to perform the following: receiving user configuration data, wherein the configuration data may include one or more of the following data: data for a time series problem; data for a regression problem; data for a classification problem, but the disclosure is not limited thereto.

According to exemplary embodiments, the instructions, when executed, may cause the processor 104 to perform the following: outputting one or more of the following models: a classification-based model based on the classification problem wherein model output is one or more discrete values out of a set of n possible values; a regression-based model based on the regression problem wherein model output is a continuous value; a clustering-based model wherein model output is a grouping of data into k different, non-overlapping partitions; and an anomaly detection-based model wherein model output indicates, for each individual instance of data, whether it is considered to be normal or anomalous, but the disclosure is not limited thereto. According to exemplary embodiments, the set of attributes may include one or more of the following data: features data corresponding to what data to be utilized to generate the desired data model; label data corresponding to what a user wants to predict; and data corresponding to machine learning problem type, but the disclosure is not limited thereto.

According to exemplary embodiments, the instructions, when executed, may cause the processor 104 to perform the following: outputting the desired data model onto a display; and implementing the data model to predict and infer data for further processing, thereby enabling users to extract value from existing data in an accurate and timely manner, leading to better business performance, but the disclosure is not limited thereto.

According to exemplary embodiments, in automatically creating the executable custom code, the instructions, when executed, may cause the processor 104 to perform the following: applying machine learning/artificial intelligence (ML/AI) algorithm onto the received data from the plurality of data sources and the selected set of attributes data and automatically simulating the custom code.

According to exemplary embodiments, the instructions, when executed, may cause the processor 104 to perform the following: calling the backend platform for processing the received data from the plurality of data sources and the selected set of attributes data via corresponding API.

According to exemplary use case, the processor 104 may run the models from a Tableau. The GUI may show a Tableau workbook that has the custom code created by the processor 104. According to exemplary embodiments, the workbook may include a "Measures" column where a user can see three fields with prefix_my_first_model_0.1 (signifying the name and version of the model) along with the names evaluate, fit and predict: _my_first_model_0.1_ evaluate; my_first_model_0.1_fit; and _my_first_model_ 0.1_predict, but the disclosure is not limited thereto. These are the custom fields (or measures) that the application has put into the Tableau workbook.

According to exemplary embodiments as disclosed above in FIGS. 1-10, technical improvements effected by the instant disclosure may include a platform for implementing a domain independent data processing module configured for adding no-code machine learning and artificial intelligence capabilities to intelligence tools, thereby allowing users who are not machine learning experts to access appropriate data, utilize flexible and elastic compute resources, and build their own models to extract value from existing data in an accurate and timely manner, leading to better business performance, but the disclosure is not limited thereto.

For example, according to exemplary embodiments as disclosed above in FIGS. 1-10, technical improvements effected by the instant disclosure may include a platform that may also provide optimized processes of implementing a domain independent data processing module that is configured to: integrate disparate data sources into a single location; indicate important and/or causal aspects of the data; generate models to be used for prediction and inference, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for generating a data model by utilizing one or more processors along with allocated memory, the method comprising:
implementing a domain independent data processing module (DIDPM) configured for adding no-code machine learning and artificial intelligence capabilities to intelligence tools, wherein the DIDPM includes a receiving module, a displaying module, a creating module, an executing module, a calling module, a generating module, an integrating module, and an outputting module, each module being called via corresponding application programming interface (API);
receiving data from a plurality of data sources by calling the receiving module;
displaying, onto a graphical user interface (GUI), a plurality of selectable icons for receiving user input in selecting a set of attributes data related to generating a desired data model by calling the displaying module;
receiving the user input of the selected set of attributes data by calling the receiving module, wherein the set of attributes includes features data corresponding to what data to be utilized to generate the desired data model, label data corresponding to what a user wants to predict, and data corresponding to machine learning problem type;
automatically creating, by calling the creating module, an executable custom code by applying a no-code machine learning and artificial intelligence (ML/AI) algorithm onto the received data from the plurality of data sources and the selected set of attributes data and automatically simulating the custom code;
executing the custom code by calling the executing module;
calling, in response to executing, a backend platform for processing the received data from the plurality of data sources and the selected set of attributes data by calling the calling module, wherein the DIDPM imports a workbook, the workbook including the custom code, into an application, wherein the application is a first part of the no-code ML/AI algorithm for democratization of ML/AI and the backend platform is a second part of the no-code ML/AI algorithm;
automatically generating, in response to calling, the desired data model based on the processed received data and the selected set of attributes data by calling the generating module;
receiving user configuration data, wherein the configuration data includes data for a time series problem, data for a classification problem by calling the receiving module, data for an anomaly detection-based problem and data for a clustering problem; and
outputting, by calling the outputting module, a classification-based model based on the classification problem wherein model output is discrete values out of a set of n possible values, an anomaly detection-based model based on the anomaly detection-based problem wherein model output indicates, for each individual instance of data, whether it is considered to be normal or anomalous, and a clustering-based model based on the clustering problem wherein model output is a grouping of data into k different, non-overlapping partitions.

2. The method according to claim 1, further comprising: receiving user configuration data that includes data for a regression problem.

3. The method according to claim 2, further comprising: outputting a regression-based model based on the regression problem wherein model output is a continuous value.

4. The method according to claim 1, wherein the plurality of data sources are disparate data sources and the received data is domain independent, and the method further comprising: integrating the received data from the plurality of disparate data sources onto a single platform.

5. The method according to claim 1, further comprising: outputting the desired data model onto a display; and implementing the desired data model to predict and infer data for further processing.

6. The method according to claim 1, further comprising: calling the backend platform for processing the received data from the plurality of data sources and the selected set of attributes data via API.

7. A system for generating a data model, the system comprising:
- a processor; and
- a memory operatively connected to the processor via a communication interface, the memory storing computer readable instructions, when executed, causes the processor to:
- implement a domain independent data processing module (DIDPM) configured for adding no-code machine learning and artificial intelligence capabilities to intelligence tools, wherein the DIDPM includes a receiving module, a displaying module, a creating module, an executing module, a calling module, a generating module, an integrating module, and an outputting module, each module being called via corresponding application programming interface (API);
- receive data from a plurality of data sources by calling the receiving module;
- display, onto a graphical user interface (GUI), a plurality of selectable icons for receiving user input in selecting a set of attributes data related to generating a desired data model by calling the displaying module;
- receive the user input of the selected set of attributes data by calling the receiving module, wherein the set of attributes includes features data corresponding to what data to be utilized to generate the desired data model, label data corresponding to what a user wants to predict, and data corresponding to machine learning problem type;
- automatically create, by calling the creating module, an executable custom code by applying a no-code machine learning and artificial intelligence (ML/AI) algorithm onto the received data from the plurality of data sources and the selected set of attributes data and automatically simulating the custom code;
- execute the custom code by calling the executing module;
- call, in response to executing, a backend platform for processing the received data from the plurality of data sources and the selected set of attributes data by calling the calling module, wherein the DIDPM imports a workbook, the workbook including the custom code, into an application, wherein the application is a first part of the no-code ML/AI algorithm for democratization of ML/AI and the backend platform is a second part of the no-code ML/AI algorithm, and through utilization of the backend platform, the application finds the desired data model on received user input of the selected set of attributes data imported by a user onto the GUI;
- automatically generate, in response to calling, the desired data model based on the processed received data and the selected set of attributes data by calling the generating module;
- receive user configuration data, wherein the configuration data includes data for a time series problem, data for a classification problem by calling the receiving module, data for an anomaly detection-based problem and data for a clustering problem; and
- output, by calling the outputting module, a classification-based model based on the classification problem wherein model output is discrete values out of a set of n possible values, an anomaly detection-based model based on the anomaly detection-based problem wherein model output indicates, for each individual instance of data, whether it is considered to be normal or anomalous, and a clustering-based model based on the clustering problem wherein model output is a grouping of data into k different, non-overlapping partitions.

8. The system according to claim 7, wherein the processor is further configured to: receive user configuration data that includes data for a regression problem.

9. The system according to claim 8, wherein the processor is further configured to: output a regression-based model based on the regression problem wherein model output is a continuous value.

10. The system according to claim 7, wherein the plurality of data sources are disparate data sources and the received data is domain independent, and the processor is further configured to: integrate the received data from the plurality of disparate data sources onto a single platform.

11. The system according to claim 7, wherein the processor is further configured to: output the desired data model onto a display; and implement the desired data model to predict and infer data for further processing.

12. The system according to claim 7, wherein the processor is further configured to: call the backend platform for processing the received data from the plurality of data sources and the selected set of attributes data via corresponding API.

13. A non-transitory computer readable medium configured to store instructions for generating a data model, wherein, when executed, the instructions cause a processor to perform the following:
- implementing a domain independent data processing module (DIDPM) configured for adding no-code machine learning and artificial intelligence (ML/AI) algorithm to intelligence tools, wherein the DIDPM includes a receiving module, a displaying module, a creating module, an executing module, a calling module, a generating module, an integrating module, and an outputting module, each module being called via corresponding application programming interface (API);
- receiving data from a plurality of data sources by calling the receiving module;
- displaying, onto a graphical user interface (GUI), a plurality of selectable icons for receiving user input in selecting a set of attributes data related to generating a desired data model by calling the displaying module;
- receiving the user input of the selected set of attributes data by calling the receiving module, wherein the set of attributes includes features data corresponding to what data to be utilized to generate the desired data model, label data corresponding to what a user wants to predict, and data corresponding to machine learning problem type;
- automatically creating, by calling the creating module, an executable custom code by applying the no-code machine learning and artificial intelligence algorithm onto the received data from the plurality of data sources and the selected set of attributes data and automatically simulating the custom code;
- executing the custom code by calling the executing module;
- calling, in response to executing, a backend platform for processing the received data from the plurality of data sources and the selected set of attributes data by calling the calling module, wherein the DIDPM imports a workbook, the workbook including the custom code, into an application, wherein the application is a first part of the no-code ML/AI algorithm for democratization of ML/AI and the backend platform is a second part of the no-code ML/AI algorithm;

automatically generating, in response to calling, the desired data model based on the processed received data and the selected set of attributes data by calling the generating module;

receiving user configuration data, wherein the configuration data includes data for a time series problem, data for a classification problem by calling the receiving module, data for an anomaly detection-based problem and data for a clustering problem; and outputting, by calling the outputting module, a classification-based model based on the classification problem wherein model output is discrete values out of a set of n possible values, an anomaly detection-based model based on the anomaly detection-based problem wherein model output indicates, for each individual instance of data, whether it is considered to be normal or anomalous, and a clustering-based model based on the clustering problem wherein model output is a grouping of data into k different, non-overlapping partitions.

14. The non-transitory computer readable medium according to claim 13, wherein, when executed, the instructions further cause the processor to perform the following: receiving user configuration data that includes data for a regression problem.

15. The non-transitory computer readable medium according to claim 14, wherein, when executed, the instructions further cause the processor to perform the following: outputting a regression-based model based on the regression problem wherein model output is a continuous value.

16. The non-transitory computer readable medium according to claim 13, wherein the plurality of data sources are disparate data sources and the received data is domain independent, and the instructions, when executed, further cause the processor to perform the following: integrating the received data from the plurality of disparate data sources onto a single platform.

17. The non-transitory computer readable medium according to claim 13, wherein, when executed, the instructions further cause the processor to perform the following: outputting the desired data model onto a display; and implementing the desired data model to predict and infer data for further processing.

* * * * *